(12) United States Patent
Olszewski et al.

(10) Patent No.: US 12,315,075 B2
(45) Date of Patent: May 27, 2025

(54) OBJECT-CENTRIC NEURAL DECOMPOSITION FOR IMAGE RE-RENDERING

(71) Applicant: Snap Inc., Santa Monica, CA (US)

(72) Inventors: Kyle Olszewski, Los Angeles, CA (US); Sergey Tulyakov, Santa Monica, CA (US); Zhengfei Kuang, Los Angeles, CA (US); Menglei Chai, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 196 days.

(21) Appl. No.: 18/090,091

(22) Filed: Dec. 28, 2022

(65) Prior Publication Data

US 2023/0215085 A1    Jul. 6, 2023

Related U.S. Application Data

(60) Provisional application No. 63/296,068, filed on Jan. 3, 2022.

(51) Int. Cl.
| | |
|---|---|
| *G06T 15/50* | (2011.01) |
| *G06T 7/194* | (2017.01) |
| *G06T 7/55* | (2017.01) |
| *G06T 7/60* | (2017.01) |
| *G06T 7/80* | (2017.01) |
| *G06T 15/06* | (2011.01) |

(52) U.S. Cl.
CPC .............. *G06T 15/50* (2013.01); *G06T 7/194* (2017.01); *G06T 7/55* (2017.01); *G06T 7/60* (2013.01); *G06T 7/80* (2017.01); *G06T 15/06* (2013.01); *G06T 2207/10028* (2013.01); *G06T 2207/20081* (2013.01); *G06T 2207/20084* (2013.01); *G06T 2210/12* (2013.01)

(58) Field of Classification Search
CPC ......... G06T 17/00; G06T 15/06; G06T 15/50; G06T 7/60; G06T 7/194; G06T 7/55; G06T 7/80; G06T 2207/20084; G06T 2210/12; G06T 2207/10028; G06T 2207/20081; G06T 19/006; G06T 7/70; G06V 20/58; G06V 20/64; G06V 10/25
See application file for complete search history.

(56) References Cited

U.S. PATENT DOCUMENTS 11,138,789 B1 * 10/2021 Arora ...................... G06T 7/521
11,373,411 B1 *  6/2022 Goh ....................... G06T 7/337
(Continued)

OTHER PUBLICATIONS

International Search Report and Written Opinion received in Patent Cooperation Treaty Application No. PCT/US2022/054163, dated Apr. 18, 2023, 10 pages.

(Continued)

*Primary Examiner* — Xilin Guo
(74) *Attorney, Agent, or Firm* — CM Law; Stephen J. Weed

(57) ABSTRACT

Three-dimensional object representation and re-rendering systems and methods for producing a 3D representation of an object from 2D images including the object that enables object-centric rendering. A modular approach is used that optimizes a Neural Radiance Field (NeRF) model to estimate object geometry and refine camera parameters and, then, infer surface material properties and per-image lighting conditions that fit the 2D images.

18 Claims, 5 Drawing Sheets

(56) References Cited

U.S. PATENT DOCUMENTS

| | | | |
|---|---|---|---|
| 2017/0004649 A1* | 1/2017 | Collet Romea | G06T 7/33 |
| 2022/0198738 A1* | 6/2022 | Xu | G06T 17/00 |
| 2022/0301257 A1* | 9/2022 | Garbin | G06N 3/045 |
| 2023/0394740 A1* | 12/2023 | Kim | G06T 15/08 |

OTHER PUBLICATIONS

Tewari, Ayush, et al., "Advances in Neural Rendering", Arxiv:2111.05849v2, Cornell University Library, Nov. 10, 2021.

Zhang, Xiuming, et al., "NeRFactor: Neural Factorization of Shape and Reflectance Under an Unknown Illumination", Arxiv:2106.01970v2, Association for Computing Machinery, vol. 40, No. 6, Dec. 22, 2021.

* cited by examiner

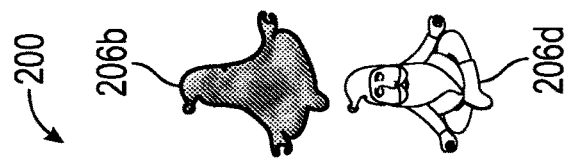
FIG. 1
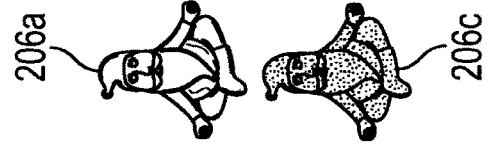
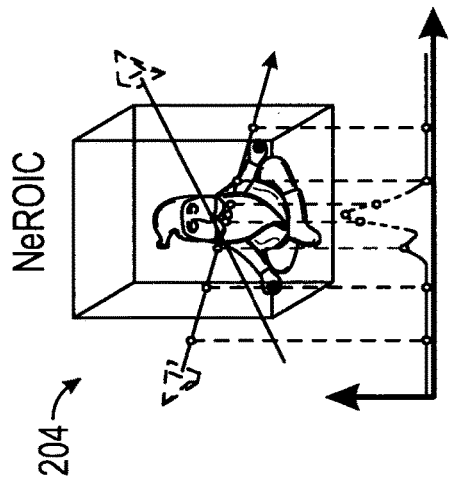
FIG. 2
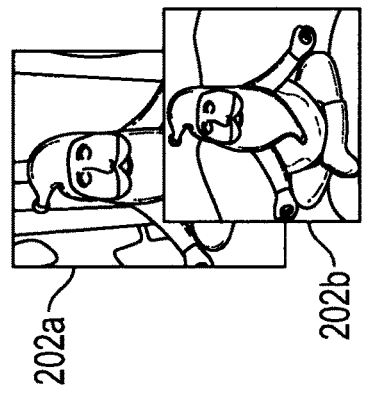

OBJECT-CENTRIC NEURAL DECOMPOSITION FOR IMAGE RE-RENDERING

CROSS-REFERENCE TO RELATED APPLICATIONS

This application claims priority to U.S. Provisional Application No. 63/296,068, filed Jan. 3, 2022, which is incorporated herein by reference in its entirety.

TECHNICAL FIELD

The present subject matter relates to systems and methods for generating three-dimensional (3D) representations of objects from two-dimensional (2D) images including the objects.

BACKGROUND

Augmented reality (AR) shopping and try-on allow brands to enhance user experience by bringing 3D representations of objects directly to users and allowing them to seamlessly interact with the representations. According to consumer tests, interacting with 3D objects provides more engagement compared to conventional catalog-based shopping.

Rendering or image synthesis is a process of generating an 3D representation of an object from a 2D or 3D image using a computer program. Rendering is typically the last step in the graphics pipeline, which gives models and animations their final appearance.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element. When referring to a non-specific one or more elements the lower-case letter may be dropped.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 1 is a block diagram of a 3D object representation and re-rendering system;

FIG. 2 is an illustration of a 3D object representation and re-rendering process;

DETAILED DESCRIPTION

Figure 3A:
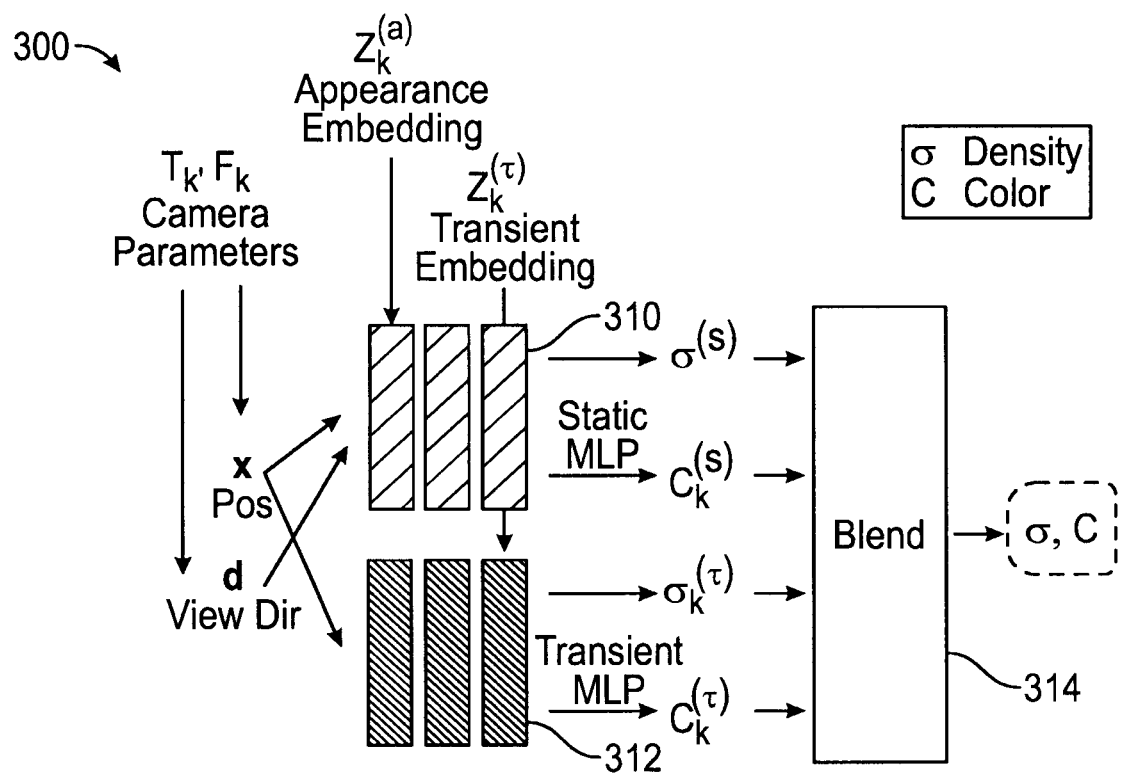
FIG. 3A is an illustration, partially in block diagram form, of a geometry estimation and camera parameter refinement module for use in the 3D object representation and re-rendering system of FIG. 1.

Three-dimensional object representation and re-rendering systems and methods for producing a 3D representation of an object from 2D images including the object that enables object-centric rendering. A modular approach is used that optimizes a Neural Radiance Field (NeRF) model to estimate object geometry and refine camera parameters and, then, infer surface material properties and per-image lighting conditions that fit the 2D images. By decoupling the estimation and refinement from the surface material property inferences and lighting conditions, more efficient sampling is achieved, which improves material and lighting estimation quality and training efficiency.

Examples of system and methods are presented herein to acquire object representations from online image collections, capturing high-quality geometry and material properties of arbitrary objects from photographs with varying cameras, illumination, and backgrounds. This enables various object-centric rendering applications such as novel-view synthesis, relighting, and harmonized background composition from challenging in-the-wild input. In accordance with one example, using a multi-stage approach extending neural radiance fields, the systems and methods initially infer the surface geometry and refine the coarsely estimated initial camera parameters, while leveraging coarse foreground object masks to improve the training efficiency and geometry quality. Examples of the systems and methods also introduce a robust normal estimation technique which reduces or substantially eliminates the effect of geometric noise while retaining details. Additionally, examples of the systems and methods extract surface material properties and ambient illumination, represented in spherical harmonics with extensions that handle transient elements, e.g., sharp shadows. The union of these components results in a highly modular and efficient object acquisition framework.

Numerous collections of images featuring identical objects, e.g., furniture, toys, vehicles, can be found online on shopping websites or through a simple image search. The ability to isolate these objects from their surroundings and capture high-fidelity structure and appearance is desired, as it would enable applications such as digitizing an object from the images and blending it into a new background. However, individual images of the objects in these collections are typically captured in highly variable backgrounds, illumination conditions, and camera parameters, making object digitization approaches specifically designed for data from controlled environments unsuitable for such an "in-the-wild" setup. Examples herein address this challenge by providing an approach for capturing and re-rendering objects from unconstrained image collections by extending the latest advances in neural object rendering.

Among the more notable recent works using implicit 3D scene representations is a Neural Radiance Fields (NeRF) model, which learns to represent the local opacity and view-dependent radiance of a static scene from sparse calibrated images, allowing high-quality novel view synthesis (NVS). While progress has been made to improve the quality and capabilities of NeRF, some non-trivial aspects still remain (e.g., to synthesize novel views of an object the background and illumination conditions should be seen and fixed, and the multi-view images or video sequences should be captured in a single session).

Several works have extended NeRF and achieved progress in decomposing the renderings of a scene into semantically meaningful components, including geometry, reflectance, material, and lighting, enabling a flexible interaction with any of these components, e.g., relighting and swapping the background. Unfortunately, none of them provide a solution to work with the limitations of objects captured from real-world, in-the-wild image collections. Examples provided herein provide a useful approach to Neural Rendering of objects from Online Image Collections (NeROIC). This object capture and rendering approach builds upon NeRFs with several features that enable high-fidelity capture from sparse images captured under wildly different conditions, which is commonly seen in online image collections with individual images taken with varying lightings, cameras, environments, and poses. A useful annotation for each image would include at least a rough foreground segmentation and coarsely estimated camera parameters, which can be obtained in an unsupervised, and cost-free way from structure-from-motion frameworks such as COLMAP (a general-purpose Structure-from-Motion (SfM) and Multi-View Stereo (MVS) pipeline with a graphical and command-line interface).

The learning-based systems and methods described herein provide a modular approach, in which the systems and methods optimize a NeRF model to estimate the geometry and refine the camera parameters in an initial stage, and then infer the surface material properties and per-image lighting conditions that best explain the captured images in a subsequent stage. The decoupling of these stages allows the use of the depth information from the initial stage to do more efficient ray sampling in the subsequent stage(s), which improves material and lighting estimation quality and training efficiency. Furthermore, due to the modularity of the approaches described herein, the systems and methods can also separately exploit the surface normals initialized from the geometry in the initial stage, including a new normal extraction layer that enhances the accuracy of acquiring materials of the underlying object. An overview of the approach is shown in FIGS. 3A to 3E.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. An example 3D asset construction system and method will be described with reference to FIGS. 1, 2, 3A-3E, 4A-4C, and 5.

FIG. 1 depicts an example object representation and re-rendering system 100. The system 100 includes a processor 102 configured to obtain and process images of an object 104. In the example illustrated in FIG. 1, the processor 102 obtains the images of the object 104 with a camera system 108. The camera system 108 may include a light source 110 and includes one or more cameras that capture images (raw images) of the object 104 from different viewpoints. In another example, the processor 102 obtains images captured by other camera systems (not shown), e.g., by downloading them from one or more sources over the Internet ("in the wild").

FIG. 2 depicts an overview 200 of a modular NeRF-based approach (NeROIC 204) that utilizes sparse, coarsely segmented images 202a, b including an object 104 (e.g., a gnome) captured under varying conditions, which may vary wildly. Using NeROIC 204, the geometry is initially inferred as a density field using neural rendering, and then the object's surface material properties and per-image lighting conditions are computed. This approach produces a model that can synthesize novel output views 206a, b, c, d that can be relit and combined with other objects and backgrounds in novel environments and lighting conditions.

Figure 3B:
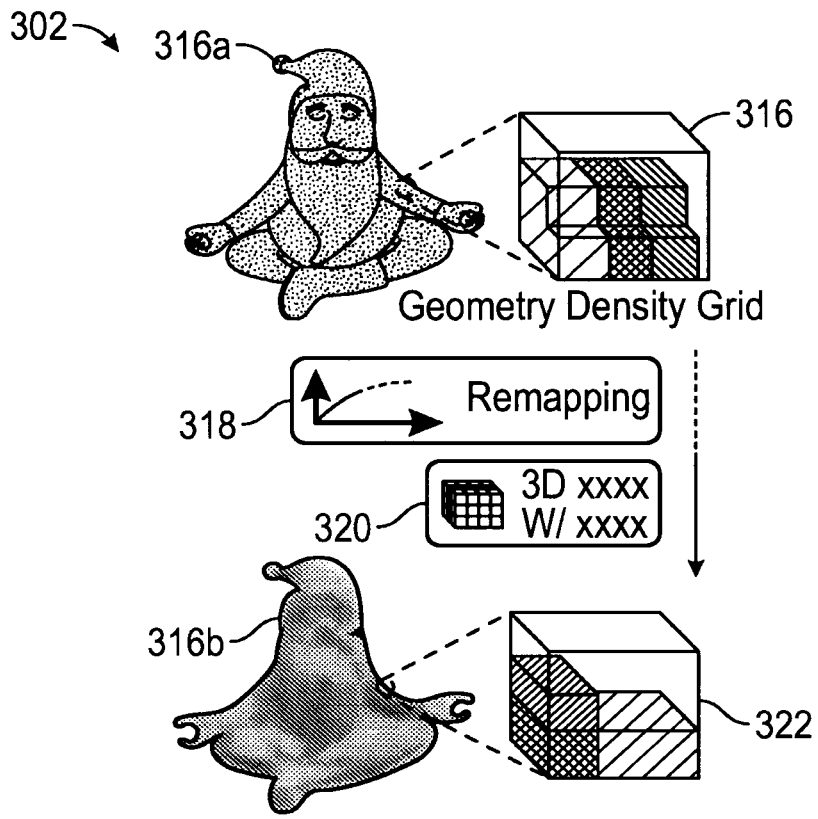
FIG. 3B is an illustration, partially in block diagram form, of a surface normal module for use in the 3D object representation and re-rendering system of FIG. 1.
Figure 3C:
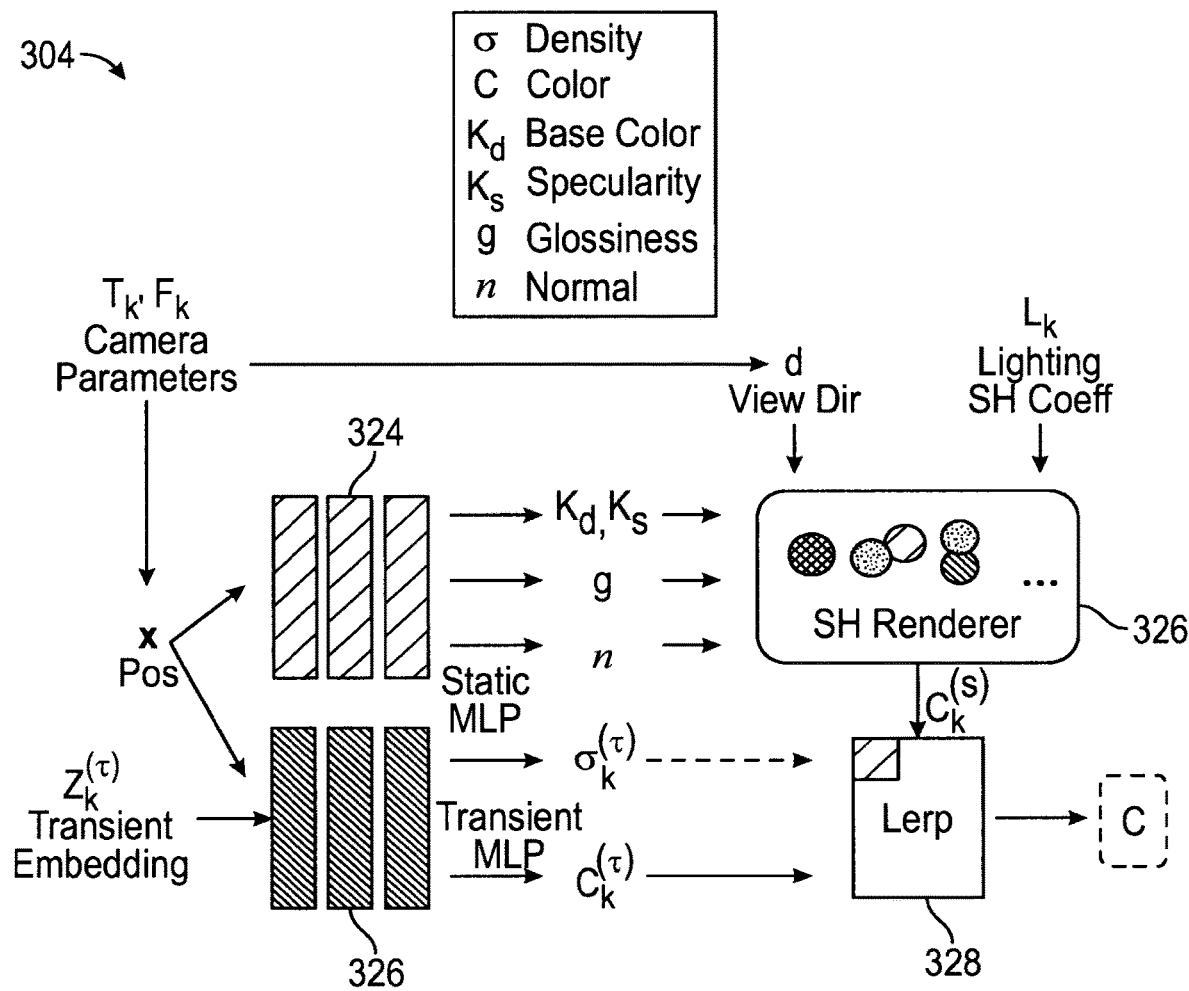
FIG. 3C is an illustration, partially in block diagram form, of a material properties and lighting module for use in the 3D object representation and re-rendering system of FIG. 1.

With reference to FIGS. 3A-3E, an overview of the approach is now provided, followed by a description of extension to the neural radiance fields framework. Generally, given a set of coarsely calibrated images and corresponding foreground masks, the geometry network described herein computes a neural radiance field with both static components (e.g., density σ, color C, base color Kd, specularity Ks, glossiness g, and normal n) and transient components (e.g., sharp shadows, varying camera parameters, coarse camera poses, and intrinsics caused by lack of background context), and refines the camera parameters (FIG. 3A). A grid-based normal extraction layer then estimates the surface normals from the learned density field (FIG. 3B). Finally, the geometry of the object is fixed and the estimated normals are used for supervision in the rendering network, in which lighting conditions (represented as spherical harmonics coefficients), surface material properties, and high-quality surface normals are inferred (FIG. 3C).

FIG. 3A depicts a geometry estimation and camera parameter stage/module 300 that reconstructs the geometry of the target object from obtained input images. A set of multilayer perceptrons (MLPs), including a static properties MLP 310 and a dynamic MLP 312, are used to infer the opacity and radiance for each point and outgoing direction in the scene by sampling camera rays and machine learning to generate the corresponding pixel color using volume rendering techniques, allowing for high-quality interpolation between sparse training images.

The inputs to this stage are a sparse collection of images $\mathcal{J}_k$: $[0, 1]^2 \rightarrow [0, 1]^3$ depicting/including an object (or instances of an identical object) under varying conditions, and a set of foreground masks $\mathcal{F}_k$: $[0, 1]2 \rightarrow \{0, 1\}$ defining the region of the object, where $1 \leq k \leq N$. During this stage, the processor 102 may estimate the geometry of the object 104 by learning a density field indicating where there is physical content. During this stage, the processor also learns both static and transient radiance values (using MLP 310 and MLP 312, respectively) to allow for image-based supervision, but does not fully decompose this information into material and lighting properties. The processor 102 also optimizes the pose and intrinsic parameters of the cameras used to capture the input images to refine the coarse estimates provided as input.

A two-branch pipeline handles transient and static content separately, and assigns unique embedding vectors $z_k^{(\tau)}$ and $z_k^{(\alpha)}$ to each image to represent the transient geometry and changing lighting. The model for this stage comprises four functions: $\sigma_k^{(s)}(x)$, $\sigma_k^{(\tau)}(x)$, and $c_k^{(s)}(x)$, $c_k^{(\tau)}(x)$. The volumetric rendering function:

$$C_k(r) = \Sigma_{i=1}^{Np} \alpha_{ki}((1-w_{ki}^{(s)})c_k^{(s)}(x_i) + (1-w_{ki}^{(\tau)})c_k^{(\tau)}(x_i)) \quad (1)$$

where $w_{ki}^{(s,\tau)} = \exp(-(d_i - d_{i-1})\sigma_k^{(s,\tau)}(x_i))$, and $\alpha_{ki} = \Pi_{j=1}^{i-1} w_{ki}^{(s)} w_{ki}^{(\tau)}$ is used, which serves as a rendering function during training of the network. Equation 1 may be implemented in a blend function 314 performed by the processor 102.

A Bayesian learning framework may be used to predict uncertainty $\beta_k(x)$ for transient geometry when accounting for the image reconstruction loss. Also, a color reconstruction loss $\mathcal{L}_c$ incorporated with $\beta_k$ and a transient regularity loss $\mathcal{L}_{tr}$ are used.

An additional loss that may be accounted for includes silhouette loss. Regarding silhouette loss, input foreground masks are used to help the networks focus on the object inside the silhouette, thus preventing ambiguous geometry from images with varying backgrounds. While the background is masked out in each image and replaced with pure white, a naive approach will still fail to discriminate the object from the background, thus producing white artifacts around the object and occluding it in novel views. To avoid this issue, a silhouette loss $\mathcal{L}_{sil}$, defined by the binary cross entropy (BCE) between the predicted ray attenuation $\alpha_k$ and the ground truth foreground mask $\mathcal{F}_k$ is used to guide the geometry learning process.

The processor 102 implements an adaptive sampling strategy using these masks. At the beginning of a training epoch, part of the background rays are randomly dropped from the training set to ensure that the ratio of the foreground rays is above 1/3. This strategy increases the training efficiency, and balances the silhouette loss and prevents $\alpha_k$ from converging to a constant.

The camera poses are jointly optimized during training to incorporate camera parameters $(\delta_R, \delta_t, \delta_f)$ for rotation, translation, and focal length, respectively. An axis-angle representation is used for rotation, while the others are in linear space. A regularity loss $\mathcal{L}_{cam}$ loss is also added for the camera parameters, which is an L2 loss on these parameters.

In summary, for this example, the final loss used for this stage is:

$$\mathcal{L}_{sil} = \mathcal{L}_c + \lambda_{tr}\mathcal{L}_{tr} + \lambda_{sil}\mathcal{L}_{sil} + \lambda_{cam}\mathcal{L}_{cam}, \quad (2)$$

where the weights of $\lambda_{tr}$, $\lambda_{sil}$, and $\lambda_{cam}$ are 0.01, 0.1, and 0.01, respectively.

FIG. 3B depicts a normal extraction stage/module 302 used for training (and which is not needed during re-rendering) in which the processor 102 optimizes surface normals for the geometry model 316a (e.g., from the initial stage 300 depicted in FIG. 3A), which is maintained in a geometry density grid 316 (e.g., in a memory accessible to processor 102). The processor 102 optimizes the surface normals by remapping 318 and reassembling 320 the geometry density grid 316 into a normal optimized geometry density grid 322 representing a normal optimized geometry model 316b. During this stage, the processor 102 uses the estimated distance from the camera to the object surface to improve point sampling along the camera rays. The processor 102 also optimizes the surface normals, which improves on the coarse estimates that are obtained from the density field.

In an example, with the learned geometry from the initial stage, the systems and methods extract the surface normals of the object as the supervision to the next stage, which helps reduce the ambiguity of the lighting and material estimation task. While conventional approaches use the gradient of the density function (i.e., $\nabla\sigma^{(s)}(x)$) as an approximation of normals, such an approach may produce incorrect results in certain situations, e.g., due to the challenging issues with unconstrained, real data (blurry images, varying lighting) that reduce the geometry quality and introduce noise into the density function. As explained with reference to FIGS. 3D and 3E, this noise can mislead the normal estimation without changing the surface shape itself. To resolve this, the systems and methods described herein propose a novel normal estimating pipeline based on the remapping of the density function and 3D convolution on a dense grid, which can produce smooth and accurate normals even with defective density.

The systems and methods first calculate the bounding box of the object. To do so, the systems and methods sparsely sample pixels of training images that are inside the foreground mask, and extract the expected surface ray intersections for each ray, gathered as a point cloud. The systems and methods directly compute the bounding box on it. After that, the systems and methods discretize the bounding box into a $512^3$ dense grid and extract the density of each grid center. For a grid center x, the systems and methods remap its density value as:

$$\sigma'_x = \frac{1}{\lambda}(1 - \exp(-\lambda\sigma_x)) \quad (3)$$

This function remaps the density value from $[0, +\infty]$ to $[0, 1/\lambda]$. The derivative gradually decays as the density value increases, which assists in filtering out noise and obtaining smoother predictions. $\lambda$ is a controllable parameter to adjust the sharpness of the normal. As λ decreases, this remapping function converges to the identity function. After remapping, the systems and methods estimate the gradient of the density field dσ'/dx by applying a 3D convolution with a Sobel kernel K(x)=x/∥x∥$_2^2$ of size 5 to the density grid.

Figure 4A:
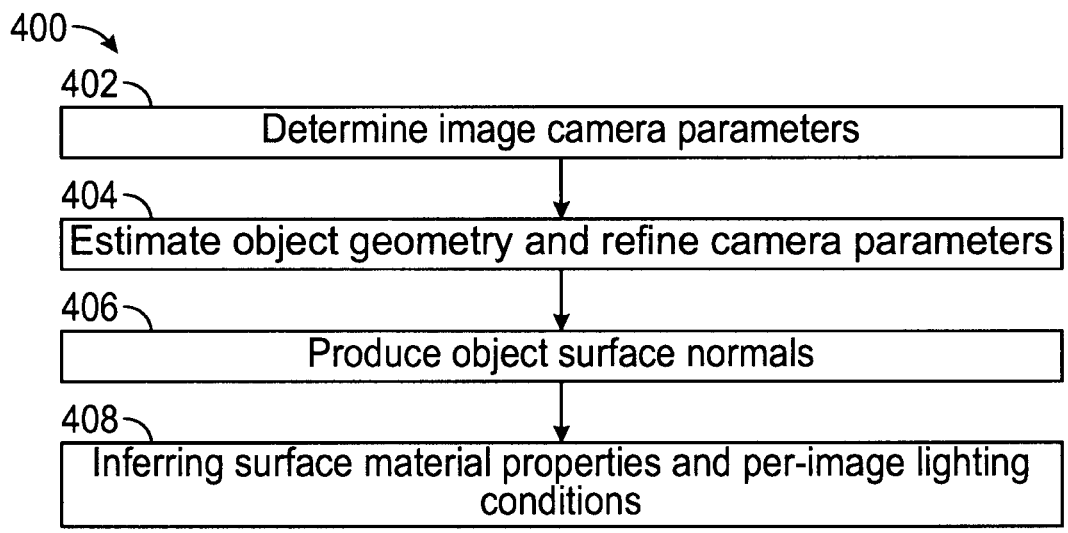
FIG. 4A is a flowchart of a 3D object representation and re-rendering method.
Figure 4B:
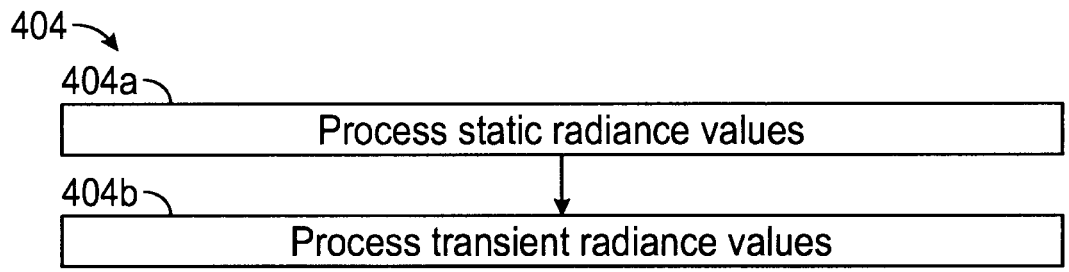
FIG. 4B is a flowchart of an object geometry estimation and camera parameters refinement process for use in the 3D object representation and re-rendering method of FIG. 4A

Finally, the systems and methods divide the convolution output $n_x^{(g)}$=−K(σ'$_x$) by max $$(1, \|n_x^{(g)}\|_2^2),$$

producing a normal supervision vector with length no larger than 1. The systems and methods treat its length as the confidence of the estimation, which becomes the weight of its supervising loss in the following stage. The results of each step are depicted in FIGS. 4A and 4B.

Figure 3D:
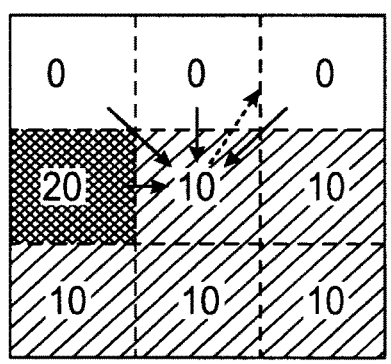
FIG. 3D is an illustration of a density field without remapping.
Figure 3E:
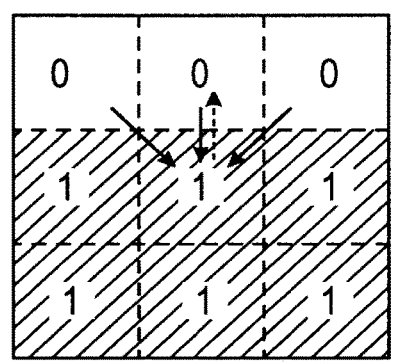
FIG. 3E is an illustration of a density field with remapping.

In the density field 340 of FIG. 3D, while the gradient-based normal prediction (arrow pointing generally in opposite direction from the other three arrows) may be affected by noise in an unbounded density field, this effect can be alleviated by density remapping (λ=1 in this case). In the density field 350 of FIG. 3E, the estimated normals with remapping are shown from the original density field 340.

FIG. 3C depicts a material properties and lighting module stage/module 304 (which forms a rendering stage/module) to estimate the lighting of each input image and the material properties of the object, given the geometry shape and surface normals from previous stages. Similar to the initial stage 300 depicted in FIG. 3A, the material properties and lighting module stage 304 may also have a set of MLPs, including a static properties MLP 324 and a dynamic MLP 326 are used. Since extracting object materials in unknown lighting is ill-posed, the systems and methods use a low-order Spherical Harmonics (SH) renderer 326 to represent the lighting model and optimize its coefficients. A linear interpolation function 328 (Lerp) is used to produce the output. The systems and methods may use a bidirectional reflectance distribution function (BRDF) to model the object material properties, which are controlled by three parameters: Kd for the base color, Ks for the specularity and g for the glossiness. The light transportation between a BRDF surface and an SH environment map can be efficiently approximated, and the systems and methods thus may employ these rendering equations in the pipeline.

Hybrid Color Prediction Using Transience.

Although the spherical harmonics illumination model typically works well on scenes with ambient environment illumination, it may not adequately represent sharp shadows and shiny highlights from high-frequency light sources. While it is difficult to acquire high-frequency details of lighting and material with respect to unconstrained input, examples of the systems and methods reduce/eliminate the effect caused by those components, and learn an unbiased result at lower frequencies. To achieve that, examples of the systems and methods use a hybrid method that combines color prediction with neural networks and parametric models. As in the geometry network described above, these examples employ the concept of transience. However, in this example, the systems and methods do not need to learn a separate transient geometry, as the geometry is fixed at this point. In some examples, the systems and methods use the volumetric rendering in Eq. 1, but replace the color function with:

$$c_k(x)=\text{lerp}(c_k^\tau(x),c^{(SH)},\exp(-\sigma_k^{(\tau)}(x))) \quad (4)$$

where $c^{(SH)}(x)$ is the output color of the SH renderer.

Estimated Depth for Acceleration.

Compared to geometry networks where color is predicted by neural networks, the rendering stage performs more computation to calculate the color of each sample point due to the more complex rendering equations. On the other hand, the learned geometry from the first networks can be used to filter out sampling points that are far away from the object, thus accelerating the whole training process. In some examples, the systems and methods develop a hybrid sampling strategy that can speed up the training without introducing significant artifacts.

For a group of $N_p$ sample points $x_i=r_o+d_ir_d$ on a ray, examples of the systems and methods build a discrete distribution along the ray with the probability of each point proportional to $\alpha_i(1-w_i)$. Then, the systems and methods calculate the expectation and variance on $d_i$ with respect to this distribution, denoted as E(d) and V(d). If the variance V(d) is smaller than a threshold $\tau_d$, the systems and methods then calculate the 3D points at depth E(d) and only use this point for the color calculation. Otherwise, the systems and methods use all sample points. Additional details are set forth below.

Neural Normal Estimation with Supervision.

The modules/networks also predict the final surface normals n(x), supervised by the output of the normal extraction layer, with the reconstruction loss $\mathcal{L}_n$ defined by:

$$\mathcal{L}_n = \left\|(\|n_x^{(g)}\|_2)\cdot n(x) - n_x^{(g)}\right\|_2^2 \quad (5)$$

Examples of the systems and methods also adopt the normal smoothing loss $\mathcal{L}_{sm}$ to improve the smoothness of the predicted normals.

Additionally, to reduce the ambiguity between the material properties and the lighting, examples of the systems and methods also add a regularity loss $\mathcal{L}_{reg}$ on both the SH coefficients and material properties. Additional details are set forth below.

In summary, the total loss of this stage may be defined as:

$$\mathcal{L}_{render}=\mathcal{L}_c+\lambda_{tr}\mathcal{L}_{tr}+\lambda_n\mathcal{L}_n+\lambda_{sm}\mathcal{L}_{sm}+\mathcal{L}_{reg} \quad (6)$$

where the weights of $\lambda_{tr}$, $\lambda_n$, and $\lambda_{sm}$ are set to 1, 5, and 0.5, respectively.

In one example, the systems and methods use a modified version of an MLP structure. In the training, the systems and methods use an Adam optimizer to learn all the parameters, with the initial learning rate set to $4*10^{-4}$. Training and inference experiments may be implemented using a PyTorch (a machine learning framework). The models described herein may be trained on 4 NVIDIA V100s with a batch size of 4096, and test the model on a single NVIDIA V100. In the initial stage, the model is trained with 30 epochs (60K-220K iterations), in roughly 6 to 13 hours. For the second stage, approximately 2 to 4 hours were needed for 10 epochs.

For all of the self-collecting datasets, approximately 40 images are collected for each object. Then, the systems and methods use the SfM pipeline in COLMAP to register the initial camera poses, with image matches generated from SuperGlue (a graph neural network that simultaneously performs context aggregation, matching and filtering of local features for wide baseline pose estimation). The foreground masks are calculated using the online mask extraction pipeline of remove.bg.

Spherical Harmonics (SH) represent a group of basis functions defined on the sphere surface, commonly used for factorizing functions and fast integration for multiplying functions. A Spherical Harmonic Ylm(θ, φ) of index l, m is defined as:

$$Y_{lm}(\theta, \phi) = \sqrt{\frac{2l+1}{4\pi} \frac{(l-m)!}{(l+m)!}} P_l^m(\cos\theta) e^{lm\phi} \quad (7)$$

where $0 \leq l \leq +\infty$, $-l \leq m \leq l$, and $P_l^m(\cos\theta)e^{lm\phi}$ are the associated Legendre polynomials.

An example rendering pipeline using Spherical Harmonics is described below. The model aims to calculate the single bounce light reflections on the object surface from a spherical environment map L, where the light transport equation is defined as:

$$B(n, \omega_0) = \int_{\omega_i \in \Omega^+} L(\omega_i) \rho(\omega_0, \omega_i)(n \cdot \omega_i) d\omega_i \quad (8)$$

where n, $\omega_i$, and $\omega_0$ are directions of surface normal, incoming light, and outgoing light, respectively, $\Omega^+$ is the upper hemisphere above the surface, and B(n, $\omega_o$), L($\omega_i$), and p($\omega_i$, $\omega_0$) are the outgoing light towards direction $\omega_o$, the incoming light from direction $\omega_i$, and the bidirectional reflectance distribution function (BRDF) between $\omega_i$ and 107 $_o$, respectively.

The functions L and p can be approximated by a group of SHs $Y_{lm}(\omega)$ as:

$$L(\omega_i) \approx \Sigma_{l,m} L_{lm} Y_{lm}(\omega_i) \quad (9)$$

$$\rho(\omega_i, \omega_0) \approx \Sigma_{l,m} \Sigma_{p,q} \rho_{lm,pq} Y_{lm}^*(\omega_i) Y_{pq}(\omega_0) \quad (10)$$

where $0 \leq \{l, p\} \leq +\infty$, $-l \leq m \leq l$, $-p \leq q \leq p$, $Y_{lm}^*$ is the conjugate of $Y_{lm}$, and $L_{lm}$, $\rho_{lm,pq}$ are coefficients calculated by applying an integration on the multiplication of functions L, ρ, and the SHs.

If the BRDF ρ is isotropic, the systems and methods can reduce its number of coefficient indices to three, denoted as $\rho_{lpq}$. The outgoing light field B can thus be approximated as:

$$B(n, \omega_0) \approx \Sigma_{l,m,p,q} B_{lmpq} C_{lmpq}(n, \omega_0) \quad (11)$$

where $B_{lmpq} = \Lambda_l L_{lm} \rho_{lpq}$, $\Lambda_l = \sqrt{4\pi/(2l+1)}$ is a normalizing constant, and $C_{lmpq}(n, \omega_o)$ is a set of basis functions.

If the BRDF is independent of $\omega_o$, Eq. 11 can be further simplified by removing $\omega_o$ as:

$$B(n) \approx \Sigma_{l,m} B_{lm} C_{lm}(n), \quad (12)$$

where $B_{lm} = \Lambda_l L_{lm} \rho_{l00} = \Lambda_l L_{lm} \rho_l$.

The Phong BRDF model can be used to represent the object material in the experiments, which is defined as:

$$\rho(\omega_i, \omega_0) = \frac{K_d}{\pi}(\omega_i \cdot n) + \frac{K_s(g+1)}{2\pi}(\omega_i \cdot \omega_r)^g, \quad (13)$$

where $K_d$, $K_s$, and g are parameters of the base color, specularity, and glossiness, and $\omega_r$, is the reflection of $\omega_o$. The two terms in Eq. 13 can be calculated separately.

The first term is also known as the Lambertian BRDF. It has been demonstrated that calculating Eq. 11 with l less than or equal to 2 can capture more than 99% of the reflected radiance of this term. Let $A_l = A_l \rho_l$ be the normalized coefficient of term ($\omega_i \cdot$n), yields $A_0 = 3.14$, $A_1 = 2.09$, $A_2 = 0.79$. Bringing them into Eq. 11, the Lambertian term can be calculated by querying the value of each SH at n, calculating the weighted sum, and finally multiplying it with Kd/π.

For the next term, a signal processing framework for inverse rendering is used where n is replaced with ωr in Eq. 11, thus making it independent of $\omega_0$ and reducible to Eq. 12. In this case, the approximation of the BRDF coefficients is given as:

$$\Lambda_l \rho_l \approx \exp\left(-\frac{l^2}{2g}\right) \quad (14)$$

The remaining steps are then the same as the first term. The renderer may be implemented in PyTorch and is fully differentiable. In experiments, l may be set to less than or equal to 3, which leads to 16 light coefficients $L_{lm}$ for each color channel to optimize (in total 16×3=48 parameters). Parameters $K_d$, $K_s$ are limited to [0, 1], and g∈[1, +∞]. To reduce the ambiguity, white specular highlights are assumed, thus setting the channels of $K_s$ to 1.

Tone mapping. Since the renderer calculates the radiance in linear HDR space, a tone-mapping process is applied to the rendered results. It can be defined as:

$$\mathcal{T}_k(x) = x^{\left(\frac{1}{\mathcal{T}_k}\right)} \quad (15)$$

where $\mathcal{T}_k$ is a trainable parameter assigned to image $\mathcal{J}_k$, and is initialized using the default value of common sRGB curves. On the other hand, it is not necessary to apply exposure compensation nor white balance to the renderer's output, assuming that the SH renderer can automatically fit these variances during the optimization.

Losses.

The color reconstruction loss $\mathcal{L}_c$ and the transient regularity loss $\mathcal{L}_{tr}$ are defined as:

$$\mathcal{L}_c(r) = \frac{\|C_k(r) - \mathcal{J}_k(r)\|_2^2}{2\beta_k(r)^2} + \frac{\log(\beta_k(r)^2)}{2} \quad (16)$$

$$\mathcal{L}_{tr}(r) = \frac{1}{N_p} \sum_{i=1}^{N_p} \sigma_k^{(\tau)}(x_i) \quad (17)$$

where r is a ray from image $\mathcal{J}_k$ and $x_i$ are the sample points along $r_s$. $\beta_k(r)$ is the uncertainty along the ray r, which integrates the uncertainty predictions at all sample points.

During the training of the rendering model, a regularity loss $L_{reg}$ can be employed to prevent improbable solutions. This loss is defined as:

$$\mathcal{L}_{reg} = \lambda_{spec} \|K_s\|_2^2 + \lambda_{gamma} \frac{1}{N} \sum_{k=1}^{N} \|\mathcal{T}_k - 2.4\|_2^2 + \quad (18)$$

$$\lambda_{light} \frac{1}{N_t} \sum_{t=1}^{N_t} \|ReLU(-L_{k_1}(\omega_t) - \tau_{light}\|_2^2$$

where coefficients $\lambda_{spec}$, $\lambda_{gamma}$, $\lambda_{light}$ are set to 0.1, 5, and 5, respectively.

The last term is for light regularization, designed to prevent negative values (lower than $-\tau_{light}$, with $\tau_{light}$ set to 0.01) in the SH lighting model, which may happen during training due to over-fitted shadows. For each iteration, $N_t$ incoming light directions $\omega_t$ and image indices $k_t$ are randomly sampled, and corresponding incoming light values for the loss calculation are evaluated. $N_t$ may be set to be identical to the batch size.

Network Structure.

In the initial stage, the geometry network, the input position vector x is embedded using a positional encoding method, which is fed into an 8-layer MLP with the hidden vector dimension of 256. The resulting embedding $z_x$, is then fed into three branches: a branch consisting of one layer to predict static density $\sigma^{(s)}$; a branch consisting of one layer to predict static color $c_k^{(s)}$, which also takes the positional-embedded view direction d and appearance embedding $z_k^{(\alpha)}$ as input; and a branch of another 4-layer MLP with a hidden vector dimension of 128, followed by several output layers to predict transient density $\sigma_k^{(\tau)}$, transient color $c_k^{(\tau)}$, and uncertainty $\beta_k$, where the transient embedding $z_k^{(\tau)}$ is also provided as input.

The second stage, the rendering network, shares the same structure as the initial stage on most components, except the branch of static color prediction. This branch is replaced by a new 4-layer MLP with the hidden vector dimension of 128, which takes x and zx as input, followed by several output layers to generate normal n, base color $K_d$, specularity $K_s$, and glossiness g.

An activation function such as ReLU (a rectified linear unit) may be used for all intermediate neural network layers. For the output layers, a smooth approximation to the ReLU function such as SoftPlus may be used for density functions, uncertainty, and glossiness; Sigmoid for static/transient/base color and specularity; and a vector normalization layer for normal estimation.

In addition to network parameters, the light coefficients $L_{k,lm}$, the camera parameters $(\delta_R, \delta_t, \delta_f)_k$, and the tone-mapping parameter $\daleth_k$ can be jointly optimized for each image $\jmath$ k.

Dataset and Training Details.

Table 3 lists the numbers of images and configurations of datasets in accordance with one example. As shown in Table 3, the datasets are split into three categories based on their sources (e.g., from NeRD, self-captured and collected from the Internet). In addition to the datasets described herein, another one, Bust, from the Internet is used.

TABLE 3

| Dataset | Image # | Train # | Test # | λ in DEL |
|---|---|---|---|---|
| From NeRD | | | | |
| Cape | 119 | 111 | 8 | 1 |
| Head | 66 | 62 | 4 | 1 |
| Gnome | 103 | 96 | 7 | 0.1 |
| MotherChild | 104 | 97 | 4 | 1 |
| Self-Captured | | | | |
| Figure | 49 | 43 | 6 | 0.1 |
| Milk | 43 | 37 | 6 | 1 |
| TV | 40 | 35 | 5 | 1 |
| From The Internet | | | | |
| Gnome 2 | 35 | 32 | 3 | 1 |
| Dog | 36 | 33 | 3 | 1 |
| Bust | 41 | 38 | 3 | 1 |

Since the controllable parameter in the depth extraction layer (DEL) is not fixed for all scenes, its values are listed in the rightmost column of the table. Besides the datasets in the table, the model was trained on synthetic datasets (Globe, Chair) for material validation.

Rays are generated and stored for all pixels from the input image before training starts. At the beginning of each epoch, foreground masks are used to ensure that the number of the chosen background rays does not exceed the foreground rays by more than a factor of 2, and then concatenate and shuffle the background and foreground rays together.

In the initial stage, the learning rate is decayed by a factor of 0.3 at intervals of 10 epochs. In the second stage, a cosine annealing schedule is used with Tmax=10 to reduce the learning rate, as the training epoch is relatively small.

Since the SfM pipeline of COLMAP also produces a sparse point cloud of the target object while solving camera poses, these can be used to help train the model. A coarse bounding box of the object is generated based on the points, and sample ray points inside the bounding box. In contrast, conventional solutions use data captured in the same scene, and the background is also used in the camera registration, making this optimization infeasible in such approaches.

Figure 4C:
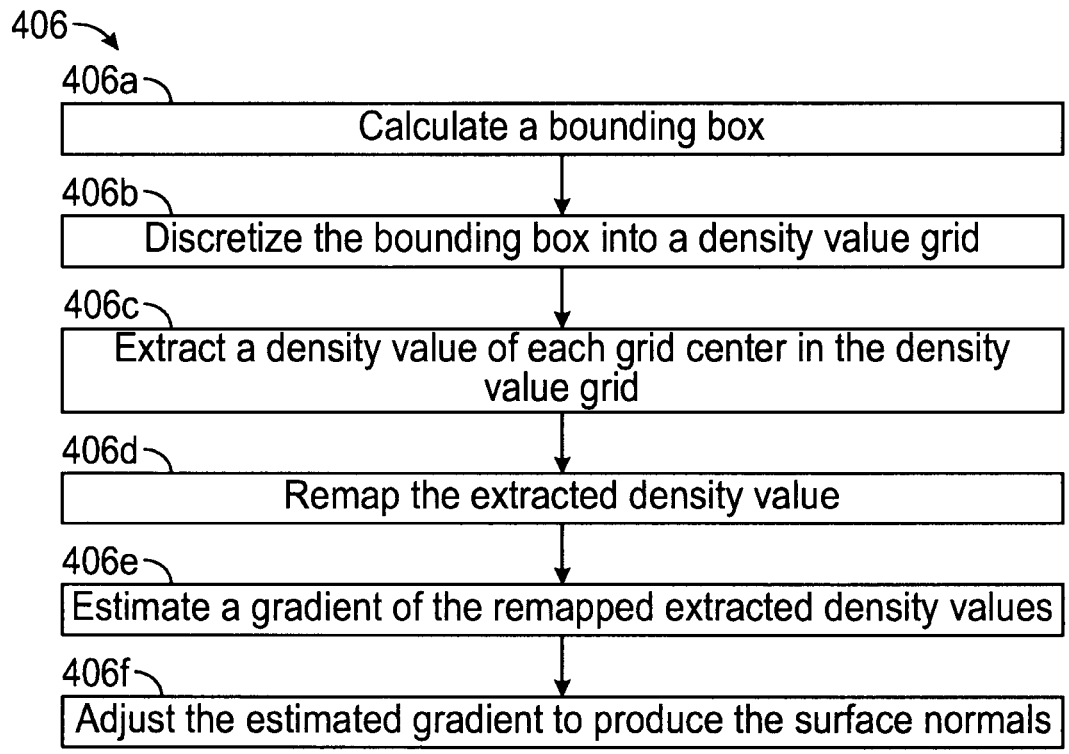
FIG. 4C is a flowchart of a surface normal production process for use in the 3D object representation and re-rendering method of FIG. 4A.

FIGS. 4A, 4B, and 4C depict flowcharts 400, 404, and 406 of example steps for generating a 3D representation of an object from 2D images, respectively. The steps are described with reference to the system 100, however, implementation using other systems will be understood by one of skill in the art from the description herein. Additionally, it will be understood that one or more steps depicted in the flowcharts may be performed sequentially as shown, out of order, at least substantially simultaneously, or may be omitted depending on the implementation.

Flowchart 400 depicts steps for 3D object representation and re-rendering. The steps of flowchart 400 may be implemented using processor 102.

At blocks 402 and 404, the processor 102 determines image camera parameters for captured 2D images, estimates object geometry, and refines camera parameters. The processor 102 may determine image camera parameters for obtained 2D images and estimate object geometry and refine camera parameters as described herein, e.g., with reference to FIG. 3A. In one example, the processor 102 estimates the object geometry and refine camera parameters by processing static radiance values (step 404a; FIG. 4B (e.g., using a static density function such as the static parameter MLP 310, for example)) and transient radiance values (step 404b; FIG. 4B (e.g., using a transient density function such as the transient parameter MLP 312, for example)). The processor 102 may additionally introduce a silhouette loss defined by a binary cross entropy between predicted ray attenuation and the corresponding foreground masks, drop part of background rays from images to maintain foreground rays above 30 percent, jointly optimize camera poses of the images incorporating rotation, translation, and focal length camera parameters, and any combination thereof.

At block 406, the processor 102 produces object surface normals. The processor 102 may determine surface normals as described herein, e.g., with reference to FIG. 3B. In one example, the processor 102 may produce object normals as depicted in flowchart 406 (FIG. 4C). In accordance with this example, the processor 102 calculate a bounding box (step 406a), discretizes the bounding box into a density value grid (step 406b), extracts a density value of each grid center in the density value grid (step 406c), remaps the extracted density value (step 406d), estimates a gradient of the remapped extracted density values (step 406e), and adjusts the estimated gradient to produce the surface normals (step 406f). It will be understood by one of skill in the art that this step is useful during development of a 3D model, but may be omitted during re-rendering of a representation. The bounding box in this example may be calculated by sparsely sampling pixels of the images that are inside a foreground mask, extracting expected surface ray intersections for each ray to produce a point cloud, and calculating the bounding box using the point cloud. In another example, the processor may produce surface normals by determining a density field, remapping the density field, and determining the surface normals from the remapped density fields.

At block 408, the processor 102 infers surface material properties and per-image lighting conditions. The processor 102 may infer surface material properties and per-image lighting conditions as described herein, e.g., with reference to FIG. 3C. In an example to infer the per-image lighting conditions the processor 102 applies spherical harmonics. In an example to infer the surface material properties and per-image lighting conditions the processor 102 generates a normal, a base color, specularity coefficient, and glossiness coefficient by inputting position to a multilayer perceptron (MLP).

Examples of the methods and systems described herein were evaluated using several in-the-wild object datasets, including images captured in varying environments, including from online resources. The comparisons with state-of-the art alternatives, in these challenging setups, indicate that the approaches described herein outperform the alternatives qualitatively and quantitatively, while still maintaining comparable training and inference efficiency.

Some contributions of various examples described herein include:
- A modular pipeline for inferring geometric and material properties from objects captured under varying conditions, using only sparse images, foreground masks, and coarse camera poses as additional input,
- A multi-stage architecture where the geometry is initially extracted and the input camera parameters are refined, and then the object's material properties are inferred, which is robust for unrestricted inputs,
- A method for estimating normals from neural radiance fields that enables better estimate material properties and relight objects than conventional techniques,
- Datasets containing images of objects captured in varying and challenging environments and conditions,
- Extensive evaluations, comparisons and results using these and other established datasets demonstrating the state-of-the-art results obtained by the approaches described herein.

Techniques described herein may be used with one or more of the computing systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computing systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computing system. As an example, implementations can include distributed processing, component/object distributed processing, and parallel processing. Moreover, virtual computing system processing can be constructed to implement one or more of the techniques or functionalities, as described herein.

Figure 5:
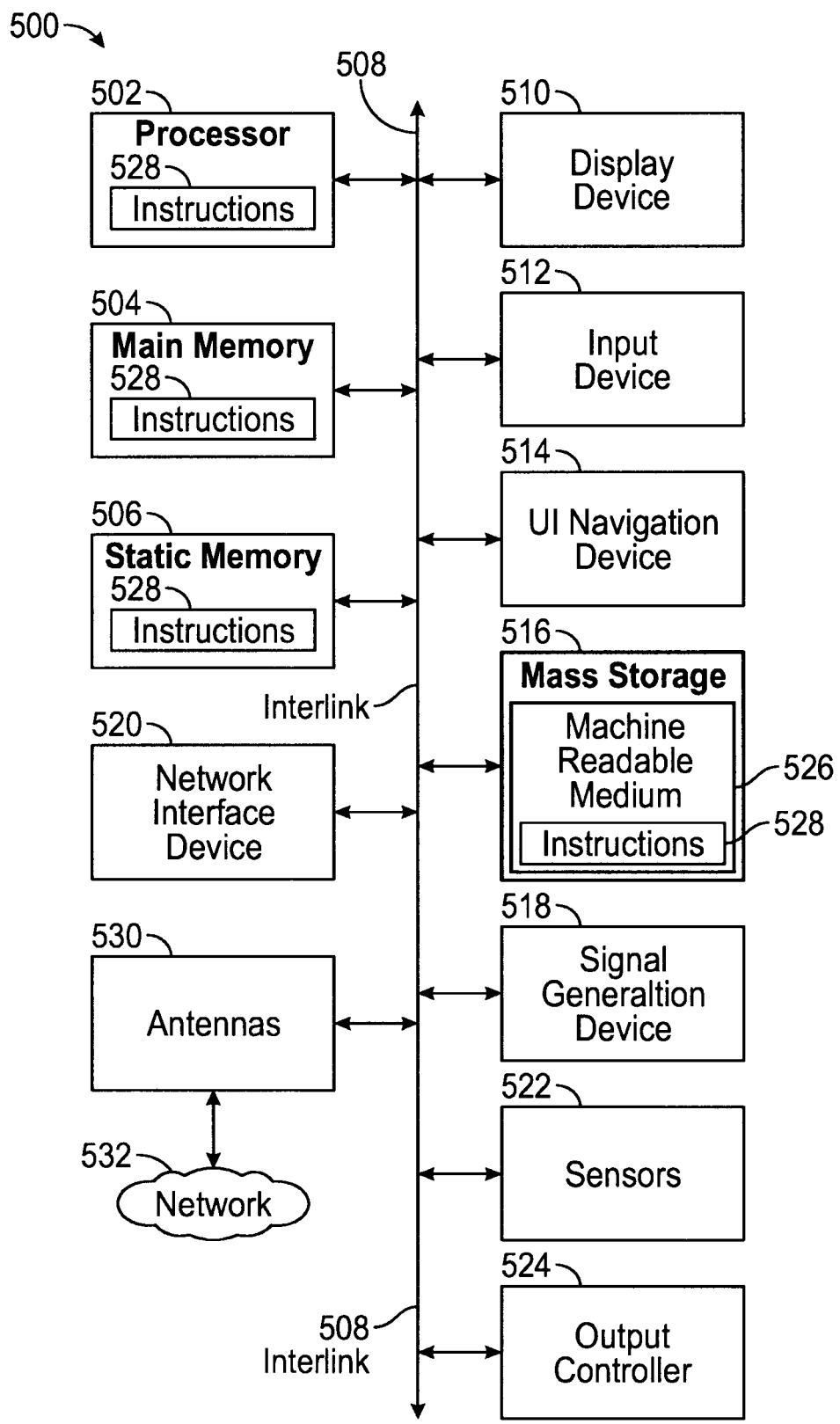
FIG. 5 is a block diagram of a sample configuration of a machine adapted to implement the method of generating 3D representations of objects in accordance with the systems and methods described herein.

FIG. 5 illustrates an example configuration of a machine 500 including components that may be incorporated into the processor 102 adapted to manage the 3D asset construction.

In particular, FIG. 5 illustrates a block diagram of an example of a machine 500 upon which one or more configurations may be implemented. In alternative configurations, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. In sample configurations, the machine 500 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of a communication system. Machine 500 may implement the methods described herein by running the software used to implement the features described herein. Further, while only a single machine 500 is illustrated, the term "machine" shall also be taken to include any collection of machines that individually or jointly execute a set (or multiple sets) of instructions to perform any one or more of the methodologies discussed herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computing systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computing system or processor) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 526 is illustrated as a single medium, the term "machine readable medium" may include a single medium or multiple media (e.g., at least one of a centralized or distributed database, or associated caches and servers) configured to store the one or more instructions 528. The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 528 may further be transmitted or received over communications network 532 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas 530 to connect to the communications network 532. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

The features and flowcharts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartwatch or other portable electronic devices. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media includes dynamic memory, such as the main memory of such a computer platform. Tangible transmission media include coaxial cables; copper wire and fiber optics, including the wires that comprise a bus within a computing system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method for generating a three-dimensional (3D) representation of an object from two-dimensional (2D) images including the object, the method comprising:
   determining camera parameters of the images including the object, the images captured under different conditions;
   estimating a geometry of the object and refining the determined camera parameters using the images including the object and corresponding foreground masks defining a region of the object within a corresponding one of the images, the estimated geometry including density information;
   producing surface normals of the object using the estimated geometry, wherein producing the surface normals comprises, for each image:
   calculating a bounding box of the object;
   discretizing the bounding box a density value grid;
   extracting a density value of each grid center in the density value grid;
   remapping the extracted density value in the density value grid using a mapping function based on a controllable parameter to adjust between smooth predictions including less noise and sharper predictions including more noise;
   estimating a gradient of the remapped extracted density values by applying a three-dimensional (3D) convolution to the remapped extracted density values in the density value grid; and
   adjusting the estimated gradient to produce the surface normals, wherein the adjusted surface normals are no larger than 1; and
   inferring surface material properties and per-image lighting conditions based on the estimated geometry and surface normals using ray sampling to obtain the 3D representation.

2. The method of claim 1, wherein estimating the geometry of the object and refining the determined camera parameters comprises:
processing static radiance values through a static branch of a pipeline; and
processing transient radiance values though a transient branch of the pipeline.

3. The method of claim 2, wherein processing the static radiance values comprises applying a static density function and a static color function, and processing the transient radiance values comprises applying a transient density function and a transient color function.

4. The method of claim 1, wherein producing the surface normals comprises, for each image:
determining a density field;
remapping the density field; and
determining the surface normals from the remapped density fields.

5. The method of claim 1, wherein calculating the bounding box comprises:
sparsely sampling pixels of the images that are inside the foreground mask;
extracting expected surface ray intersections for each ray to produce a point cloud; and
calculating the bounding box using the point cloud.

6. The method of claim 1, wherein estimating the geometry of the object and refining the determined camera parameters comprises at least one of:
introducing a silhouette loss defined by a binary cross entropy between predicted ray attenuation and the corresponding foreground masks;
dropping part of background rays from images to maintain foreground rays above 30 percent; or
jointly optimizing camera poses of the images incorporating rotation, translation, and focal length camera parameters.

7. The method of claim 1, wherein inferring per-image lighting conditions comprises:
applying spherical harmonics to infer per-image lighting conditions.

8. The method of claim 1, wherein inferring the surface material properties and per-image lighting conditions comprises:
generating a normal, a base color, specularity coefficient, and glossiness coefficient by inputting position to a multilayer perceptron (MLP).

9. A method for displaying a three-dimensional (3D) representation of an object from two-dimensional (2D) images including the object, the method comprising:
obtaining the 2D images;
generating the 3D representation of an object from the 2D images including the object according to the method of claim 1; and
displaying the 3D representation of the object on a display.

10. A rendering model for generating a three-dimensional (3D) representation of an object from two-dimensional (2D) images including the object, the rendering model comprising:
a geometry estimation and camera parameter module configured to estimate a geometry of the object and refine camera parameters using the images including the object and corresponding foreground masks defining a region of the object within a corresponding one of the images, the estimated geometry including density information;
a surface normal module configured to produce surface normals of the object using the estimated geometry wherein to produce the surface normals comprises, the surface normal module is configured to, for each image:
calculate a bounding box of the object;
discretize the bounding box into a density value grid;
extract a density v e of each grid center in the density value grid;
remap the extracted density value in the density value grid using a mapping function based on a controllable parameter to adjust between smooth predictions including less noise and sharper predictions including more noise;
estimate a gradient of the remapped extracted density values by applying a three-dimensional (3D) convolution to the remapped extracted density values in the density value grid; and
adjust the estimated gradient to produce the surface normals, wherein the adjusted surface normals are no larger than 1; and
a material properties and lighting module configured to infer surface material properties and per-image lighting conditions based on the estimated geometry and surface normals using ray sampling to obtain the 3D representation.

11. The rendering model of claim 10, wherein the rendering model includes a pipeline having a static branch configured to process static radiance values and a transient branch configured to process transient radiance values.

12. The rendering model of claim 11, wherein the static branch includes a static density function and a static color function, and the transient branch includes a transient density function and a transient color function.

13. The rendering model of claim 10, wherein to produce the surface normals, the surface normal module is configured to, for each image:
determine a density field;
remap the density field; and
determine the surface normals from the remapped density fields.

14. The rendering model of claim 10, wherein to calculate the bounding box the surface normal module is configured to:
sparsely sample pixels of the images that are inside the foreground mask;
extract expected surface ray intersections for each ray to produce a point cloud; and
calculate the bounding box using the point cloud.

15. The rendering model of claim 10, wherein to estimate the geometry of the object and refine camera parameters the geometry estimation and camera parameter module is configured to at least one of:
introduce a silhouette loss defined by a binary cross entropy between predicted ray attenuation and the corresponding foreground masks;
drop part of background rays from images to maintain foreground rays above 30 percent; or
jointly optimize camera poses of the images incorporating rotation, translation, and focal length camera parameters.

16. The rendering model of claim 10, wherein spherical harmonics are used by the material properties and lighting module to infer per-image lighting conditions.

17. The rendering model of claim 10, wherein to infer the surface material properties and per-image lighting conditions the material properties and lighting module is configured to:
generate a normal, a base color, specularity, and glossiness by inputting position to a multilayer perceptron (MLP).

18. An electronic device comprising:
a display;
a memory configured to store the rendering model of claim 10; and
a processor coupled to the display and the memory, the processor configured to implement the rendering model and present the three-dimensional (3D) representation of the object on the display.

\* \* \* \* \*